United States Patent [19]
Drori

[11] 4,067,812
[45] Jan. 10, 1978

[54] FILTER CONSTRUCTION

[76] Inventor: Mordeki Drori, 89 Zahal Street, Kiron, Israel

[21] Appl. No.: 715,544

[22] Filed: Aug. 18, 1976

[30] Foreign Application Priority Data

June 23, 1976 Israel .................................... 49874

[51] Int. Cl.² ............................................. B01D 27/08
[52] U.S. Cl. .................................. 210/310; 210/435; 210/444; 210/456
[58] Field of Search ............... 210/310, 435, 443, 444, 210/456, 457, 460, 488

[56] References Cited

U.S. PATENT DOCUMENTS

| | | | |
|---|---|---|---|
| 2,670,851 | 3/1954 | Curtis | 210/435 |
| 2,907,466 | 10/1959 | Beddow | 210/456 X |
| 3,322,281 | 5/1967 | Gulick | 210/443 X |
| 3,355,021 | 11/1967 | Jones | 210/456 |
| 3,369,665 | 2/1968 | Paulson | 210/456 X |
| 3,789,990 | 2/1974 | Drori | 210/310 |
| 3,859,216 | 1/1975 | Sisson et al. | 210/443 |
| 3,890,232 | 6/1975 | Cambest et al. | 210/223 |

Primary Examiner—Theodore A. Granger
Attorney, Agent, or Firm—Benjamin J. Barish

[57] ABSTRACT

A filter comprises an inner rigid metal tube connectable at its opposite ends to the fluid pipe line, and a spaced outer plastic housing enclosing the inner rigid tube. The latter is formed with two groups of holes through its wall, and with a deflector between the groups of holes for deflecting the fluid to flow through one group of holes, the space between the inner tube and the other housing, and the second group of holes. A filter body is disposed in the space between the outer plastic housing and the inner rigid tube.

Two embodiments of the invention are described, one being an in-line construction wherein the filter body is coaxial to the inner rigid tube, and the other being an off-line construction wherein the filter body is at right angles to the inner tube.

6 Claims, 4 Drawing Figures

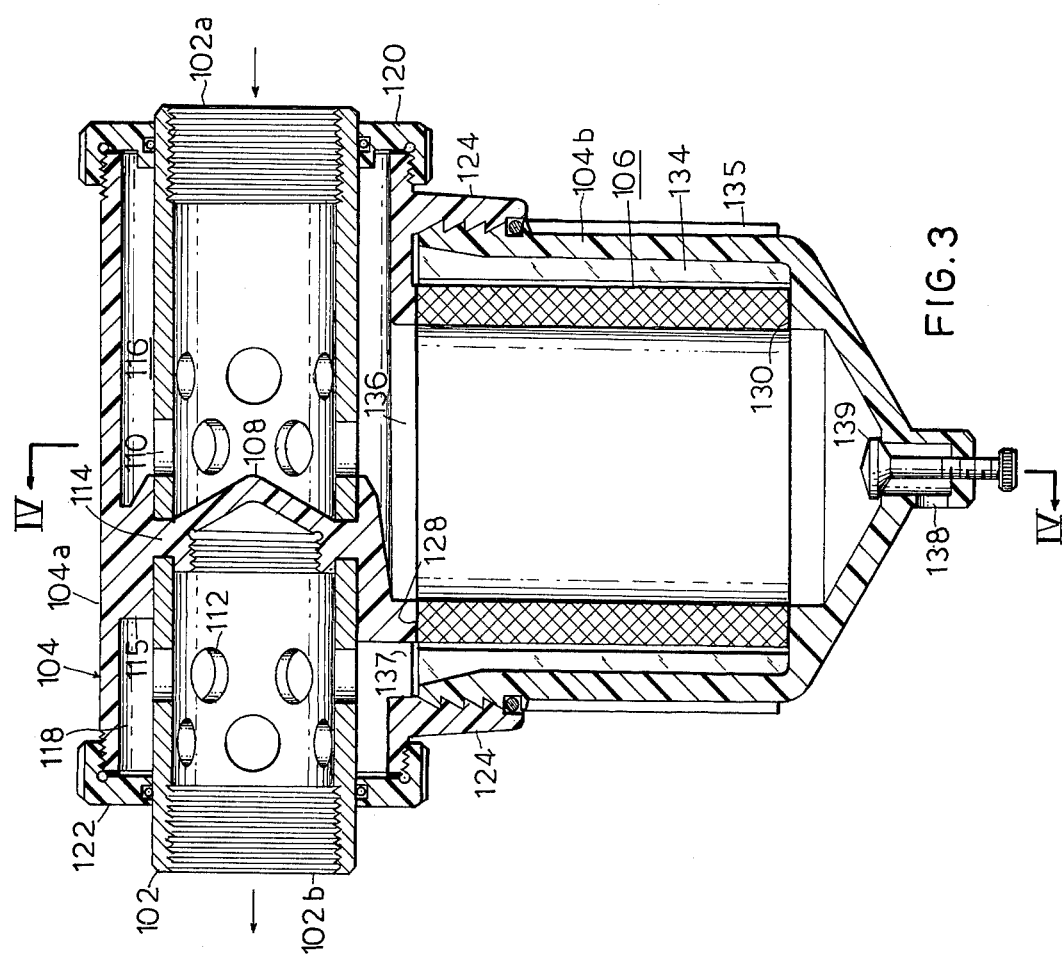
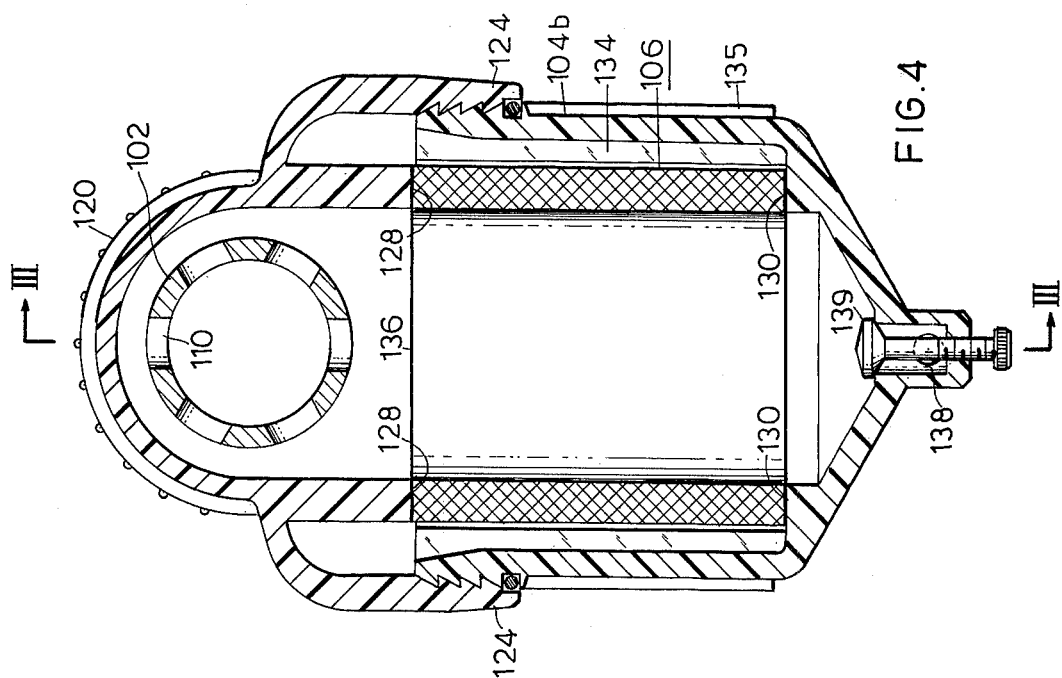

FILTER CONSTRUCTION

BACKGROUND OF THE INVENTION

The present invention relates to filters connectable between two fluid pipes of the general type described in my prior U.S. Pat. No. 3,789,990 of Feb. 5, 1974.

The above-cited patent discloses a filter comprising an inner rigid supporting body which effects a rigid mechanical connection, independently of its housing, between the two fluid pipes to which it is connected. Thus, the housing may be easily removed to enable cleaning the filter without disconnecting the two pipes. In addition, the housing may be made of plastic material since it is not required to withstand the axial loads to which the filter is subjected by the two fluid pipes. Primarily for these reasons, the filter of that patent has enjoyed considerable commercial success.

SUMMARY OF THE PRESENT INVENTION

An object of the present invention is to provide improved filter constructions which substantially reduce the number of parts required and thereby substantially lower the cost of manufacture.

According to the present invention, the filter comprises an inner rigid tube of great mechanical strength including connecting means (e.g. threads) at its opposite ends for connecting same to the upstream and downstream pipes, respectively. The inner rigid tube, preferably of metal, is formed with axially spaced holes through its wall. An outer housing, preferably of plastic, encloses the inner rigid tube and is radially spaced from its holes. The filter further includes walls sealing the opposite ends of the housing to the opposite ends of the inner rigid tube, and a deflector within the inner rigid tube between the axially spaced holes for deflecting the fluid from the upstream pipe to flow through a path including one (or group) of the holes in the inner rigid tube, the space between the inner rigid tube and the outer housing, and another (or group) of the holes in the inner rigid tube to the downstream pipe. The filter body is disposed in the latter path between the two mentioned holes (or groups of holes), either in-line with the upstream and downstream pipes according to one described embodiment, or off-line with the pipes according to a second described embodiment.

Further features and advantages of the invention will be apparent from the description below.

BRIEF DESCRIPTION OF THE DRAWINGS

The invention is herein described, by way of example only, with reference to the accompanying drawings, wherein:

FIG. 3 is a longitudinal sectional view of an off-line filter constructed in accordance with the present invention; and FIG. 4 is a sectional view along lines IV—IV of FIG. 3.

DESCRIPTION OF TWO PREFERRED EMBODIMENTS

Figure 1:
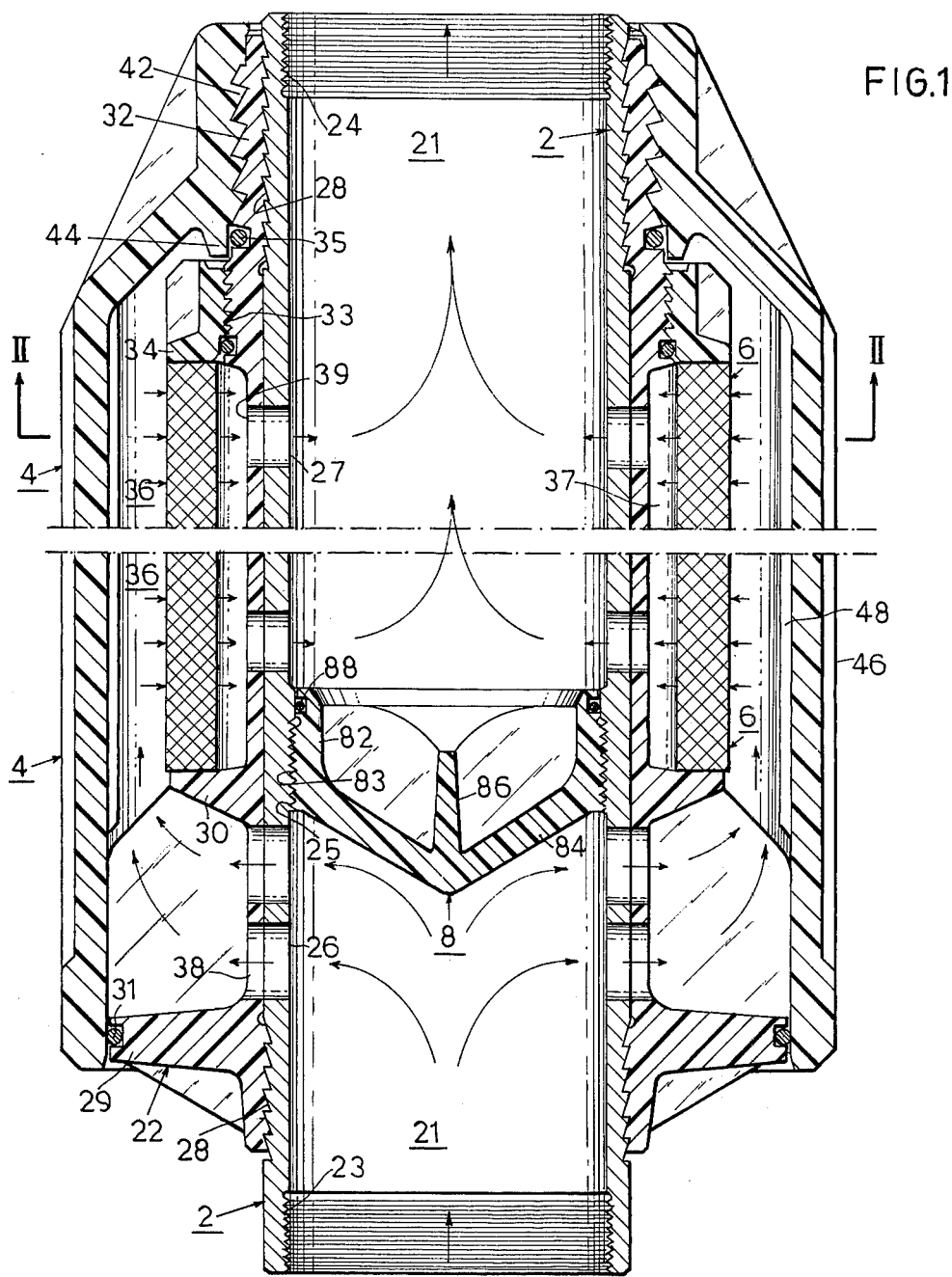
FIG. 1 is a longitudinal sectional view of an in-line filter constructed in accordance with the present invention.
Figure 2:
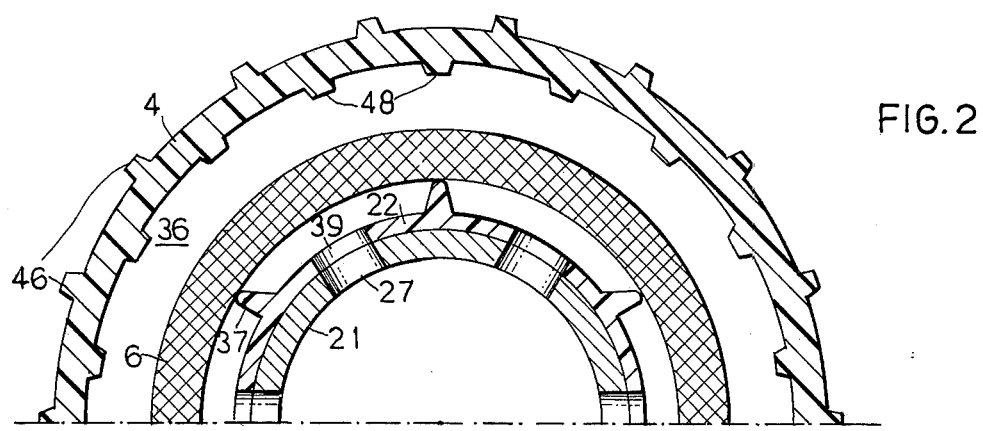
FIG. 2 is a transverse sectional view along lines II—II of FIG. 1.

The filter illustrated in FIGS. 1 and 2 of the drawings comprises four main members, namely: an inner rigid member generally designated 2, an outer tubular housing generally designated 4, a filter body generally designated 6 disposed between the inner member 2 and the outer tubular housing 4, and a deflector generally designated 8 disposed within the inner rigid member 2.

More particularly, the inner member 2 is constituted of a central rigid metal tube 21 and an outer plastic body 22 bonded thereto. Metal tube 21 is formed with an axial passageway extending therethrough and with internal threads 23, 24 at its opposite ends for connection between two fluid pipes (not shown) carrying the fluid (e.g., water, petroleum, or gases) to be filtered. Tube 21 is further formed with internal threads 25 for threadingly receiving the deflector 8, the latter being externally threaded for this purpose. Finally, metal tube 21 has one or more openings 26 extending through its wall at one side of deflector 8, and a plurality of openings 27 extending through its wall at the opposite side of the deflector.

The outer plastic body 22 may be injection-molded onto metal tube 21 so as to be firmly bonded thereto. The outer surface of the metal tube 21 may be threaded or corrugated at its opposite ends, as shown at 28, to enhance the bonding of the plastic body 22 thereto.

Plastic body 22 is formed with an annular wall 29 extending radially outwardly adjacent to one end of metal tube 21, and with an annular shoulder 30 between openings 26 and 27 of the metal tube. The outer surface of annular wall 29 is grooved for the reception of a sealing ring 31 adapted to be engaged by the corresponding end of the outer tubular housing 4. The opposite end of plastic body 22 is externally threaded, as shown at 32, for removably receiving the corresponding end of tubular housing 4, the latter being internally threaded for this purpose. Further external threads 33 are formed in plastic body 22 for receiving a locking ring 34, and an additional annular recess is formed between threads 32 and 33 for receiving a sealing ring 35.

The filter body 6 is firmly pressed against annular shoulder 30 by locking ring 34. The shoulder, locking ring and filter all have an external diameter smaller than the internal diameter of the outer tubular housing 4 to define an annular chamber 36 between the filter and housing. The filter body 6 is preferably constituted of a plurality of grooved annular discs, as in the above-cited patent, which discs are held between shoulder 30 and locking ring 34. In addition, the outer surface of plastic body 22 includes a plurality of axial ribs 37 between the shoulder and locking ring to space the inner surface of the filter discs from the outer surface of the plastic body. This body is further formed with a plurality of openings 38, 39 aligned with openings 26, 27 in the metal tube 21 to provide radial passageways connected to annular chamber 36 at each side of deflector 8.

The outer tubular housing 4 is formed with internal threads 42 cooperable with threads 32 of plastic body 22 for removably attaching the housing thereto. The opposite end of housing 4 is of larger diameter, and has a smooth internal surface to enable it to be slidingly received over annular wall 29, sealing ring 31 effecting a seal between the two. In addition, housing 4 includes an internal axial lip 44 received over sealing ring 35 for sealing that end of the housing.

Housing 4 is preferably of plastic material and is formed with external axial ribs 46 and internal axial ribs 48 for strengthening purposes.

Deflector 8, also preferably made of plastic, includes an annular wall 82 externally threaded at 83 to cooperate with threads 25 of the metal tube 21, a conical front wall 84, and strengthening ribs 86 connecting the two walls together. Annular wall 82 is further formed with a recess for receiving a sealing ring 88.

The filter of FIGS. 1 and 2 operates in the following manner:

Assuming that threads 23 of the rigid metal tube 21 are connected to the upstream fluid pipe and threads 24 are connected to the downstream pipe, it will be seen that the fluid flowing into end 23 of the pipe is deflected by deflector 8 to flow through openings 26, 38 into the outer annular chamber 36, and then flows through the filter body 6, openings 39, 27, and out through the opposite end of the metal pipe 21. Thus, the fluid flow through the filter will be in the inward direction. It will be appreciated, however, that end 24 of the metal tube 21 could be connected to the upstream pipe, in which case the flow through the filter will be in the outward direction. In either arrangement, deflector 8 should be applied so that its conical front wall 84 faces the upstream pipe.

The advantages of the improved construction of FIGS. 1 and 2 will be apparent from the above description. Thus, it requires substantially fewer parts than in the construction illustrated in the above-cited patent, which simplifies the manufacture of the filter and substantially lowers its cost. In addition, the assembly and disassembly of the filter for cleaning and maintenance purposes are simplified, and the number of seals required is significantly reduced, thereby lowering the maintenance costs.

The filter illustrated in FIGS. 3 and 4 is of similar construction as that described above, in that it also comprises four main members, namely: an inner rigid tube of great mechanical strength (e.g. of metal) generally designated 102; an outer housing of less mechanical strength (e.g. of plastic) generally designated 104; a cylindrical filter body generally designated 106; and a deflector generally designated 108 disposed within the inner rigid tube 102. The filter of FIGS. 3 and 4, however, is an off-line construction (rather than an in-line one as described above) in that the filter body 106 is not coaxial with the inner rigid tube 102 and the upstream and downstream fluid pipes (not shown) connected thereto, but rather is at right angles to that tube and to the pipes to which it is connected. For this purpose, the outer housing 104 is made of two sections, namely a horizontal section 104a parallel to and overlying tube 102, and a vertical section 104b below and at right angles to housing section 104a and tube 102. The cylindrical filter body 106 is disposed within the vertical housing section 104b.

The inner rigid metal tube 102 includes threads at its opposite ends, i.e. inlet end 102a and outlet end 102b, for connecting same to the upstream and downstream pipes (not shown) respectively. Tube 102 is further formed with one or more openings 110 (a plurality being shown) through its wall on one side of deflector 108, and with similar one or more openings 112 through its wall on the other side of the deflector, so that the deflector is located between these axially-spaced openings 110, 112. The deflector 108 and the horizontal housing section 104a are preferably both formed simultaneously by injection moulding plastics material over and within the inner rigid tube 102, such that some of the plastics material also flows through additional openings 114 in the inner rigid tube 102 to firmly fix the deflector 108 and the horizontal housing section 104 to the tube 102.

One end of the horizontal housing section 104a is radially spaced from holes 110 to provide a first chamber 116, and the opposite end of the horizontal housing section is radially spaced from holes 112 to provide a second chamber 118, the two chambers being separated by partition 115 constituted by the plastics material flowing through openings 114 during the injection moulding of the housing section 104a and the deflector 108. End caps 120 and 122 are threaded onto the ends of the housing section 104a into engagement with the respective ends of the inner tube 102 and thereby serve as walls sealing the respective ends of the chambers 116 and 118.

The horizontal housing section 104a is formed with an internally threaded socket 124 depending from its lower surface, which socket receives the vertical housing section 104b for the filter body 106, section 104b being threaded at its upper end for mating with the threads of socket 124. The lower wall of the horizontal housing section 104a further includes a depending annular flange or ledge 128 within socket 124, and the inner surface of the vertical housing section 104b includes another annular ledge 130 aligned with ledge 128. The filter body 106 is constituted of a stack of filter discs clamped between the annular ledges 128 and 130 when the vertical housing section 104b is threaded within socket 124 of the horizontal housing section 104a.

The inner surface of housing section 104b is formed with a plurality of axially-extending circumferentially-spaced ribs 134 which engage the outer surfaces of the filter discs 130 so as to space them from the internal surface of the housing section 104b. The outer surface of housing section 104b may be similarly formed with a plurality of axiallly-extending circumferentially-spaced ribs 135 to facilitate its manual rotation when it is threaded into socket 124 of the horizontal housing section 104a.

The horizontal housing section 104a is further formed with a large opening 136 inboard of its annular ledge 128 so as to establish communication (via holes 110) between the interior of filter body 106 and the inlet end 102a of tube 102, and with a smaller opening 137 between annular ledge 128 and its socket 124 to establish communication (via holes 112) between the outlet end 102b of the tube and the space between the outer surface of the filter body 106 and the inner surface of the vertical housing section 104b. The bottom of housing section 104b is formed with a dirt-purging port 138 communicating with the interior of the filter body 106, which port is opened by withdrawing a plug 139 in order to discharge from the filter the dirt particles accumulating in the bottom of housing section 104b.

When using the illustrated filter, its inlet end 102a is connected to the upstream pipe and its outlet end 102b is connected to the downstream pipe. The water flows into inlet 102a, and, being blocked by deflector 108, is forced to flow through holes 110 into chamber 116, through opening 136 into the interior of the cylindrical filter body 106, through the filter body (namely through the spaces between its discs) to the space between the external surface of the filter body and the internal surface of the housing section 104b, through opening 137 into chamber 118, and finally through holes 112 back into the interior of tube 102 and out through its outlet end 102b.

The FIGS. 3 and 4 construction also has a number of advantages. Thus, as in FIGS. 1 and 2, the inner metal tube 102 takes up all the mechanical stresses imposed by the pipe line to which the filter is connected and thereby relieves the outer housing 104 of such stresses, enabling the housing sections to be constructed of less expensive plastics material. Further, the filter may be cleaned without detaching same from the pipes to which it is connected, by merely detaching the vertical housing section 104b, which thereby provides access to the filter body 106 for cleaning same. In addition, the off-line arrangement illustrated provides for compactness, and also permits the convenient purging of the filter of large dirt particles by merely removing the plug 139 to open the bottom purging port 138.

What is claimed is:

1. A filter connectable between two fluid pipes, one upstream and the other downstream of the filter, comprising: an inner rigid tube of great mechanical strength including first connecting means at one end for connecting same to the upstream fluid pipe, and second connecting means at its opposite end for connecting same to the downstream fluid pipe; said rigid tube being formed with first and second axially-spaced holes through its wall; an outer housing enclosing said inner rigid tube and radially spaced from said first and second holes thereof; first wall means sealing one end of the outer housing to said one end of the inner rigid tube; second wall means sealing the opposite end of the outer housing to said opposite end of the inner rigid tube; a deflector within said inner rigid tube between its first and second axially spaced holes for deflecting the fluid from the upstream pipe to flow through a path including said first hole in the inner rigid tube, the space between the inner rigid tube and the outer housing, and the second hole in the inner rigid tube to the downstream pipe; and a filter body disposed in said path between said first and second holes in the inner rigid tube to filter the fluid flowing through said path; said outer housing including a horizontal section enclosing and coaxial with the inner rigid tube, a partition between the inner surface of the latter housing section and the inner rigid tube between said first and second holes thereof, and a vertical section below and at right angles to the horizontal section and the inner rigid tube; said filter body being of cylindrical shape and disposed within said vertical housing section with its interior communicating with the first hole on one side of said deflector and its exterior communicating with the second hole on the other side of the deflector to filter the fluid flowing through said path between said first and second holes.

2. A filter according to claim 1, wherein the inner surface of the vertical housing section is formed with a plurality of axially-extending circumferentially-spaced ribs engaging the outer surface of the cylindrical filter body and spacing same from the inner surface of the vertical housing section.

3. A filter according to claim 2, wherein the vertical section of the housing is formed with a first opening establishing communication between the upstream end of the inner rigid tube and the interior of the cylindrical filter body, and with a second opening establishing communication between the downstream end of the inner rigid tube and the space between the outer surface of the cylindrical filter body and the inner surface of the vertical housing section.

4. A filter according to claim 3, wherein the vertical housing section is threaded onto the horizontal housing section and clamps the cylindrical filter body between it and the horizontal housing section when threaded thereon.

5. A filter according to claim 4, wherein the cylindrical filter body includes a plurality of filter discs clamped between flat annular ledges formed on the horizontal housing section and the vertical housing section when the latter is threaded on the former.

6. A filter according to claim 3, wherein the vertical housing section includes a dirt-purging port at its lower end communicating with the interior of the cylindrical filter body, and a plug for opening same to wash out the dirt particles accumulating in the bottom of the vertical housing section.

* * * * *